United States Patent [19]

Nishimura et al.

[11] Patent Number: 4,678,928

[45] Date of Patent: Jul. 7, 1987

[54] CONTROLLER FOR AUTOMATICALLY EFFECTING DISENGAGEMENT OF BUCKLE DEVICE

[75] Inventors: Yuji Nishimura; Akinori Fujiwara; Shigeyasu Kanada, all of Niwa, Japan

[73] Assignee: Kabushiki Kaisha Tokai-Rika-Denki-Seisakusho, Aichi, Japan

[21] Appl. No.: 810,205

[22] Filed: Dec. 18, 1985

[30] Foreign Application Priority Data

Dec. 26, 1984 [JP] Japan .......................... 59-199396[U]

[51] Int. Cl.$^4$ ............................................ B60R 21/00
[52] U.S. Cl. ............................ 307/10 SB; 307/10 R; 340/52 E; 280/801; 297/468
[58] Field of Search ..................... 307/10 R, 10 SB; 340/52 E, 52 F, 52 H; 280/801–808, 733–735; 180/270, 281, 282; 297/468–480, 485, 486; 24/171, 644, 653, 635

[56] References Cited

U.S. PATENT DOCUMENTS

| 3,235,930 | 2/1966 | Chapin et al. ................... 297/468 |
| 3,876,031 | 4/1975 | Stouffer ...................... 307/10 SB X |
| 4,049,293 | 9/1977 | Bouju ........................... 280/801 X |
| 4,187,925 | 2/1980 | Lindblad .................... 307/10 SB X |
| 4,189,022 | 2/1980 | Lazich et al. ................... 280/801 X |
| 4,236,141 | 11/1980 | Terabayashi et al. ...... 307/10 SB X |
| 4,344,502 | 8/1982 | Terabayashi ............... 307/10 SB X |
| 4,381,829 | 5/1983 | Montaron ........................ 280/733 X |
| 4,410,875 | 10/1983 | Spies et al. ........................ 340/52 H |
| 4,489,804 | 12/1984 | Kamijo ............................ 297/476 X |
| 4,553,625 | 11/1985 | Tsuge et al. .................... 280/801 X |
| 4,555,831 | 12/1985 | Otzen et al. .................... 297/468 X |
| 4,570,872 | 2/1986 | Tsujimura et al. ............. 280/807 X |
| 4,574,911 | 3/1986 | North ............................. 280/801 X |

Primary Examiner—William M. Shoop, Jr.
Assistant Examiner—Shik Luen Paul
Attorney, Agent, or Firm—Parkhurst & Oliff

[57] ABSTRACT

A controller for automatically effecting disengagement of a buckle device includes a moving means which moves a lock plate engaged with a tongue plate. When a predetermined period of time has elapsed after the acceleration acting on the vehicle exceeds a predetermined value, the controller controls the moving means such that the tongue plate and the lock plate are automatically disengaged from each other. It is possible to automatically disengage the tongue plate from the buckle device in an emergency situation, such as collision or overturn, of the vehicle.

16 Claims, 8 Drawing Figures

(a) Potential at point A (b) Potential at point $Q_1$ — $T_1$ (c) Potential at point $Q_2$ — $T_2$

CONTROLLER FOR AUTOMATICALLY EFFECTING DISENGAGEMENT OF BUCKLE DEVICE

BACKGROUND OF THE INVENTION

1. Field of the Invention

The present invention relates to a controller for automatically disengaging a tongue plate from a buckle device of a seatbelt system for a vehicle designed to protect an occupant in an emergency situation of the vehicle.

2. Description of the Related Art

A typical seatbelt system is arranged such that an occupant, after seating himself in a seat, engages a tongue plate attached to one end of an occupant restraining webbing with a buckle device, whereby the occupant is brought into a webbing fastened condition.

Examples of conventional apparatus for automatically disengaging the tongue plate from the buckle device include one in which when the occupant opens the door, the tongue plate engaged with the buckle device is automatically disengaged (see the specification of Japanese Patent Application No. 140276/1983).

This type of conventional apparatus, however, suffers from the disadvantage that even in an emergency situation, such as collision or overturn, of the vehicle, it is necessary for the occupant to open the door in order to automatically disengage the tongue plate from the buckle device.

SUMMARY OF THE INVENTION

It is an object of the present invention to provide a controller for automatically effecting disengagement of a buckle device which is so designed that when an emergency situation, such as collision or overturn, of the vehicle occurs, the tongue plate is automatically disengaged from the buckle device when a predetermined period of time has elapsed after detection of the emergency situation.

It is another object of the present invention to provide a controller for automatically effecting disengagement of a buckle device which is so designed that, in a normal state of the vehicle, the tongue plate is automatically disengaged from the buckle device by opening the door, and when an emergency situation of the vehicle occurs, the tongue plate is automatically disengaged from the buckle device when a predetermined period of time has elapsed after detection of the emergency situation.

To these ends, the present invention provides a controller for automatically effecting disengagement of a buckle device, comprising: moving means for moving a lock plate which is engaged with a tongue plate; emergency sensor means for detecting an emergency situation of the vehicle; and emergency disengagement control means for effecting control such that when a predetermined period of time has elapsed after detection of an emergency situation of the vehicle, the moving means is activated so that the lock plate is moved in a direction in which the tongue plate and the lock plate are disengaged from each other.

According to the present invention, when an emergency situation of the vehicle is detected, unwinding of the webbing is prevented by means of an inertia type lock mechanism in a manner similar to that in conventional seatbelt systems so that the occupant is protected, and when a predetermined period of time has elapsed after the detection of the emergency situation, the tongue plate and the lock plate are automatically disengaged from each other.

Thus, the present invention enables the occupant to get out of the vehicle easily at the time of an emergency situation, since the tongue plate and the lock plate are automatically disengaged from each other when a predetermined period of time has elapsed after the emergency situation has been detected.

According to another aspect of the present invention, there is provided a controller for automatically effecting disengagement of a buckle device, comprising: an actuator for moving a lock plate in a direction in which it is disengaged from a tongue plate; door sensor means for detecting whether a door of the vehicle is opened or closed; emergency sensor means for detecting an emergency situation of the vehicle; normal disengagement control means for effecting control such that when the door sensor means detects that the door is opened, driving current is supplied to the actuator so that the lock plate is disengaged from the tongue plate; and emergency disengagement control means for effecting control such that when a predetermined period of time has elapsed after the emergency sensor means has detected an emergency situation of the vehicle, driving current is supplied to the actuator so that the lock plate is disengaged from the tongue plate.

By virtue of the above arrangement, when the door is opened in a normal state of the vehicle, the normal disengagement control means causes the lock plate to be disengaged from the tongue plate, thereby allowing the tongue plate to be automatically disengaged from the buckle device. When an emergency situation of the vehicle occurs, the emergency sensor means which is constituted by an acceleration sensor or the like is activated, and the emergency disengagement control means causes the lock plate to be disengaged from the tongue plate when a predetermined period of time has elapsed after the detection of the emergency situation whereby the tongue plate is automatically disengaged frm the buckle device.

The controller according to the present invention is provided with not only the normal disengagement control means but also the emergency disengagement control means. Accordingly, when the occupant opens the door and the door sensor means detects that the door is opened, the lock plate is disengaged from the tongue plate, thereby allowing the tongue plate to be automatically disengaged from the buckle device. Further, when an emergency situation of the vehicle occurs, the lock plate is disengaged from the tongue plate when a predetermined period of time has elapsed after the emergency sensor means has detected the emergency situation, whereby the tongue plate is automatically disengaged from the buckle device.

Further, according to the present invention, the driving force produced through the control effected by the emergency disengagement control means is set such as to be larger than the driving force by the normal disengagement control means.

It is therefore possible to reliably effect the operation of disengaging the tongue plate from the lock plate in an emergency situation of the vehicle.

DESCRIPTION OF THE PREFERRED EMBODIMENTS

Figure 1:
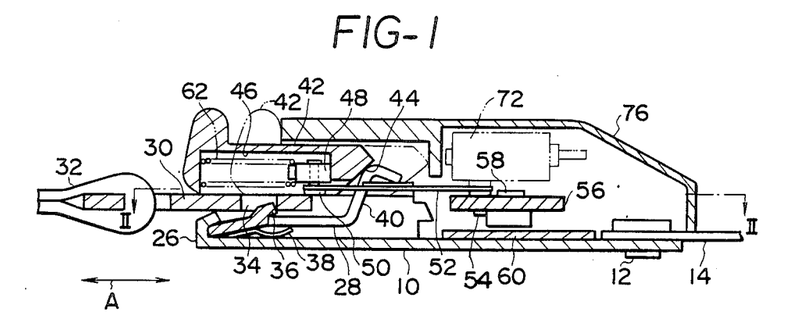
FIG. 1 is a sectional view showing the mechanical arrangement of a first embodiment of the controller for automatically effecting disengagement of a buckle device according to the present invention.
Figure 2:
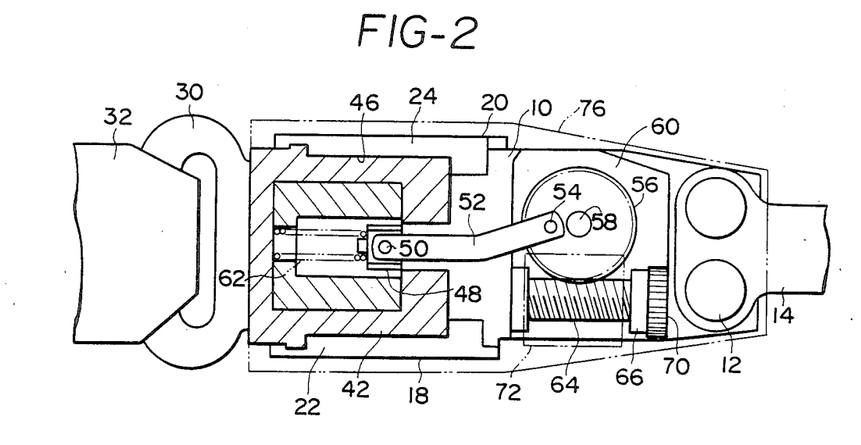
FIG. 2 is a sectional view taken along the line II—II of FIG. 1.
Figure 3:
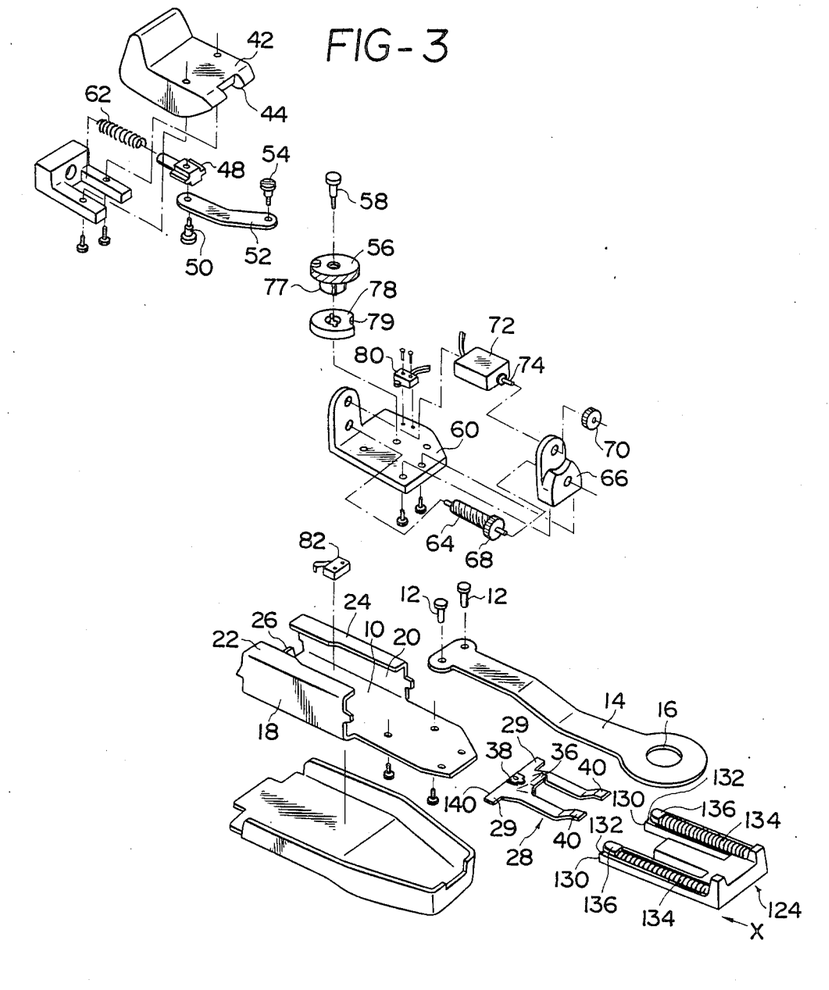
FIG. 3 is an exploded perspective view of the first embodiment shown in FIG. 1.

Referring first to FIGS. 1 to 3 which show in combination a first embodiment of the present invention, one end of an anchor plate 14 is secured to one end of a buckle base 10 by rivets 12. A circular bore 16 is, as shown in FIG. 3, provided in the other end of the anchor plate 14 so that this end of the anchor plate 14 is secured to a vehicle body by means of a mounting bolt (not shown) through the bore 16. Thus, the anchor plate 14 and the buckle base 10 are provided on the vehicle body so as to project therefrom.

Both lateral edges of the other end portion of the buckle base 10 are bent at right angles so as to provide a pair of leg plates 18, 20 extending parallel to each other. Further, the respective distal end portions of the leg plates 18, 20 are bent at right angles so as to provide projecting pieces 22, 24 extending toward each other.

The buckle base 10 further has a bent portion 26 at the end on the side thereof which is remote from the anchor plate 14. One end of a lock plate 28 is inserted into the recess defined by the bent portion 26. The lock plate 28 is pivotal about the bent portion 26 and has its intermediate portion disposed within the space defined between the projecting pieces 22, 24 and the buckle base 10.

Further, a guide piece 124 is inserted into the space between the leg portions 18, 20 in the direction of the arrow X shown in FIG. 3. A shaft piece 29 is provided at the lower end of the lock plate 28. The shaft piece 29 is disposed between the bent portion 26 and the end faces 130 of the guide piece 124.

A tongue plate 30 is inserted into the space defined between the respective reverse surfaces of the projecting pieces 22, 24 and slide surfaces 132 formed on the guide piece 124 in the direction of the arrow A shown in FIG. 1. The slide surfaces 132 of the guide piece 124 are formed parallel to each other, and a groove is formed in each slide surface 132 so as to extend longitudinally thereof. A return spring 134 is fitted in each groove. A pressing member 136 which slides on each slide surface 132 is secured to the distal end of the corresponding return spring 134. The tongue plate 30 slides on the slide surfaces 132 while pressing the pressing members 136 against the respective biasing forces of the return springs 134. One end of an occupant restraining webbing 32 is retained by one end portion of the tongue plate 30. An engagement opening 34 is formed in the other end portion of the tongue plate 30.

The tongue plate 30 is adapted to engage with the lock plate 28 when it is inserted into the buckle base 10 to an approximately maximum extent. More specifically, a leaf spring 38 is interposed between the lock plate 28 and the buckle base 10. An engagement pawl 36 enters the engagement opening 34 of the lock plate 28 so as to engage therewith, thereby preventing the tongue plate 30 from being undesirably pulled out from the buckle base 10.

A pair of release arms 40 project parallel to each other from the lock plate 28 so as to face a slanted surface 44 formed at one end of a slide button 42. The slide button 42 is movable along the leg plates 18, 20 in the direction in which the tongue plate 30 is inserted, from the solid-line position to the two-dot chain line position shown in FIG. 1. In the solid-line position, the slanted surface 44 applies no turning force to the release arms 40. However, when the slide button 42 moves rightwardly as viewed in FIG. 1 to reach the two-dot chain line position, the slanted surface 44 engages with the release arms 40 and causes the lock plate 28 to pivot clockwise as viewed in FIG. 1 so that the engagement pawl 36 is disengaged from the engagement opening 34 of the tongue plate 30, thereby disengaging the lock plate 28 from the tongue plate 30.

A recess 46 is formed in the slide button 42 so as to face the buckle base 10. A slide piece 48 is disposed within the recess 46. The slide piece 48 is pivotally supported at one end of an arm 52 through a pin 50. The other end of the arm 52 is pivotally supported through a pin 54 at a position on a worm wheel 56 which is eccentric with respect to the central axis of the worm wheel 56. The worm wheel 56 is rotatably supported by a bracket 60 through a pin 58. The bracket 60 is secured to the buckle base 10.

Accordingly, as the worm wheel 56 rotates, the pin 54 rotates around the central axis of the worm wheel 56. In consequence, the arm 52 causes the slide button 42 to move rightwardly as viewed in FIGS. 1 and 2 through the pin 50 and the inner peripheral surface of the recess 46. A compression coil spring 62 is interposed between the slide piece 48 and the inner peripheral surface of the recess 46 so that the slide button 42 is returned to the solid-line position shown in FIG. 1 when it is released from the force applied thereto by the arm 52.

A worm 64 is meshed with the worm wheel 56. One end of the worm 64 is rotatably supported directly by the bracket 60, and the other end of the worm 64 is rotatably supported by the bracket 60 through a bracket 66.

A spur gear 68 is secured to the central shaft of the worm 64 projecting out from the bracket 66 and is meshed with a small spur gear 70 rotatably supported by the bracket 66. The small spur gear 70 is secured to the output shaft 74 of a motor 72 secured to the bracket 60. Accordingly, the turning force from the motor 72 is transmitted through the combination of the small spur gear 70 and the spur gear 68 and the combination of the worm 64 and the worm wheel 56 so that the rotational speed of the motor 72 is reduced, and is then transmitted to the slide button 42 in the form of the turning force of the worm wheel 56.

A shaft 77 projects from the lower end face of the worm wheel 56. A disk-shaped cam 78 is fitted on the shaft 77. The cam 78 has a notch 79 provided in its peripheral surface. A position sensor switch 80 is secured to the bracket 60 by screws so as to face the cam 78. The switch 80 turns OFF only when it faces the notch 79. In other words, the switch 80 can detect that the arm 52 is in its reciprocation.

An engagement sensor switch 82 is secured to the buckle base 10 by screws. When the engagement pawl 36 is engaged with the engagement opening 34, the switch 82 is pressed by the distal end portion of the tongue plate 30 so as to turn ON.

It is to be noted that a door of the vehicle is provided with a door switch 84 (see FIG. 4) for detecting whether or not the door is opened. The switch 84 turns ON when the door is opened. Further, an acceleration sensor switch 86 is provided on an acceleration sensor (not shown) provided on a webbing retractor (not shown). The switch 86 turns ON when the acceleration acting on the vehicle exceeds a predetermined value as a result of, for example, collision of the vehicle. It should be clear that "acceleration" as used throughout the specification refers to deceleration as well (i.e., acceleration refers to the absolute value of the rate of change of velocity).

It is to be noted also that the webbing retractor in accordance with this embodiment is provided with an inertia type lock mechanism similar to one which is conventionally employed, the lock mechanism being activated when an emergency situation of the vehicle occurs so as to prevent the webbing from being unwound from the retractor in order to securely restrain the body of the occupant by the webbing.

Figure 4:
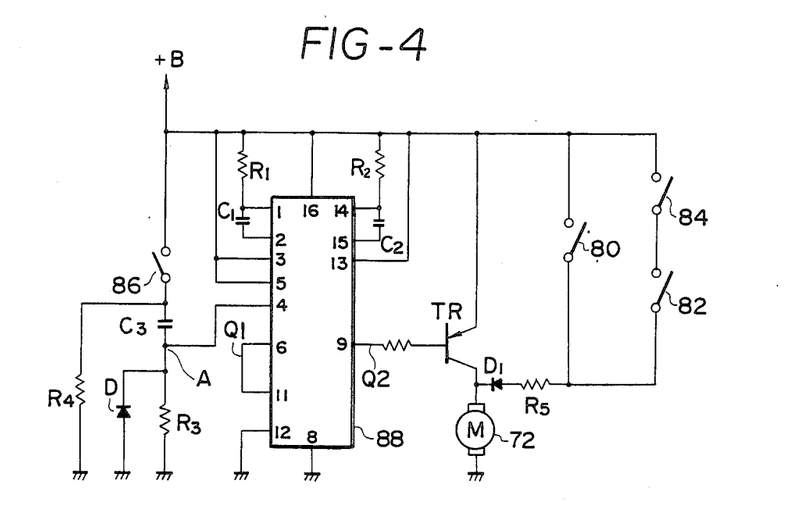
FIG. 4 is a diagram showing a control circuit in accordance with the first embodiment.

A control circuit for controlling the motor 72 will now be described with reference to FIG. 4.

Figure 5:
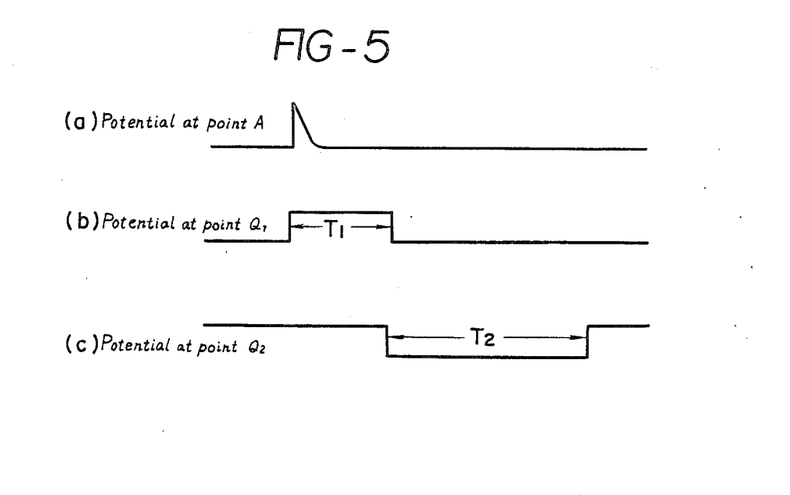
FIG. 5 is a waveform chart showing the operation of the control circuit shown in FIG. 4.

This control circuit employs an IC 88 (TC4538BP, manufactured by Toshiba Corp.) which includes two monostable multivibrators. The signal from the acceleration sensor switch 86 is input to one of the monostable multivibrators of the IC 88 as a trigger input. A differentiating circuit composed of a capacitor $C_3$ and a resistor $R_3$ which are connected in series is connected in series to the acceleration sensor switch 86. A diode D for eliminating any differential negative pulse is connected in parallel to the resistor $R_3$. In addition, a resistor $R_4$ is connected to the capacitor $C_3$ for discharging this capacitor. Accordingly, when the acceleration sensor switch 86 is turned ON and then turned OFF, the potential at a point A on the side of the capacitor $C_3$ which is remote from the switch 86 changes as shown in FIG. 5(a). This trigger input activates one of the monostable multivibrators of the IC 88, so that the potential at a point $Q_1$ in the IC 88 changes as shown in FIG. 5(b). The width $T_1$ of the pulse shown in FIG. 5(b) is determined by the product of the respective values of a capacitor $C_1$ and a resistor $R_1$ which are externally connected to the IC 88. In response to the decay of this pulse shown in FIG. 5(b), the other monostable multivibrator is activated, so that the potential at a point $Q_2$ in the IC 88 changes as shown in FIG. 5(c). The period of time $T_2$ during which the potential at the point $Q_2$ is at the low level is determined by the product of the respective values of a resistor $R_2$ and a capacitor $C_2$ which are externally connected to the IC 88. The output (the potential at the point $Q_2$) of this monostable multivibrator is input to the base of a transistor TR. The motor 72 is connected in series to the collector terminal of the transistor TR. The arrangement is such that when the potential at the point $Q_2$ falls to the low level, the transistor TR turns ON to start the motor 72. A series circuit which is composed of the position sensor switch 80, a resistor $R_5$ and a diode $D_1$ is parallel-connected between the emittor and collector of the transistor TR.

Further, a series circuit of the door switch 84 and the engagement sensor switch 82 is parallel-connected between two terminals of the position sensor switch 80.

The following is a description of the operation of the first embodiment arranged as detailed above.

The occupant closes the door after entering the vehicle and inserts the tongue plate 30 into the buckle base 10. In consequence, the engagement pawl 36 is engaged with the engagement opening 34 by means of the biasing force of the leaf spring 38, and the tongue plate 30 is thereby reliably retained by the buckle base 10, thus allowing the occupant to be fastened by the webbing 32.

When the occupant has the webbing 32 fastened, the engagement sensor switch 82 turns ON, while the position sensor switch 80 turns OFF.

When the occcupant opens the door for the purpose of leaving the vehicle, the door switch 84 turns ON. In consequence, current is supplied to the motor 72 through the resistor $R_5$ and the diode $D_1$ so as to rotate the motor 72.

The turning force from the motor 72 is transmitted to the worm wheel 56 after its speed has been reduced. In consequence, the arm 52 causes the slide piece 48 to move rightwardly as viewed in FIGS. 1 and 2. Since the slide piece 48 causes the slide button 42 to move along the leg plates 18, 20 through the inner peripheral surface of the recess 46, the slanted surface 44 causes the lock plate 28 to pivot clockwise as viewed in FIG. 1 through the release arms 40, whereby the engagement pawl 36 is disengaged from the engagement opening 34. Thus, it is possible for the tongue plate 30 to be pulled out from the buckle base 10. Even after the tongue plate 30 has been pulled out, the supply of electric power to the motor 72 is continued, since the position sensor switch 80 remains ON. When the worm wheel 56 rotates one full turn, the cam 78 causes the switch 80 to turn OFF. The supply of power to the motor 72 is therefore cut off, and the slide button 42 consequently returns to the position shown in FIGS. 1 and 2. Accordingly, it is possible for the occupant to unfasten the webbing simply by opening the door, which is particularly convenient for a physically handicapped person.

During this automatically disengaging operation, the compression coil spring 62 interposed between the slide piece 48 and the slide button 42 exerts no force counter to the driving force from the motor 72. It is therefore possible for the driving force from the motor 72 to be reliably transmitted to the slide button 42 so as to be moved.

When the occupant manually unfastens the webbing, it suffices to move the slide button 42 against the biasing force of the compression coil spring 62. More specifically, since the slide piece 48 is at rest, the slide button 42 moves rightwardly as viewed in FIG. 1 while compressing the compression coil spring 62, and the slanted surface 44 causes the lock plate 28 to pivot clockwise through the release arms 40.

The operation of this embodiment in an emergency situation of the vehicle will be described below.

When an emergency situation of the vehicle occurs, that is, when the acceleration acting on the vehicle exceeds a predetermined value, the acceleration sensor switch 86 turns ON, and after a predetermined period of time $T_1$ has elapsed, the potential at the point $Q_2$ in the IC 88 falls to the low level. In consequence, current is supplied to the motor 72 through the transistor TR so as to rotate the motor 72. The transistor TR remains ON only during a predetermined period of time $T_2$. The time $T_2$ is set such as to be equal to the time required for the cam 78 to rotate one full turn. Accordingly, when an emergency situation of the vehicle occurs, the tongue plate 30 is disengaged from the buckle device after a predetermined period of time has elapsed in a manner similar to the above.

Since current is supplied to the motor 72 through the resistor $R_5$ in a normal state of the vehicle, the voltage applied to the motor in a normal state is lower than that in an emergency situation of the vehicle. More specifically, a higher voltage is applied to the motor 72 in an emergency situation than in a normal state of the vehicle, and the motor 72 consequently outputs a correspondingly increased driving force in an emergency situation. It is therefore possible for the tongue plate 30 to be reliably disengaged from the buckle device.

A second embodiment of the present invention will be described below with reference to FIG. 6.

Figure 6:
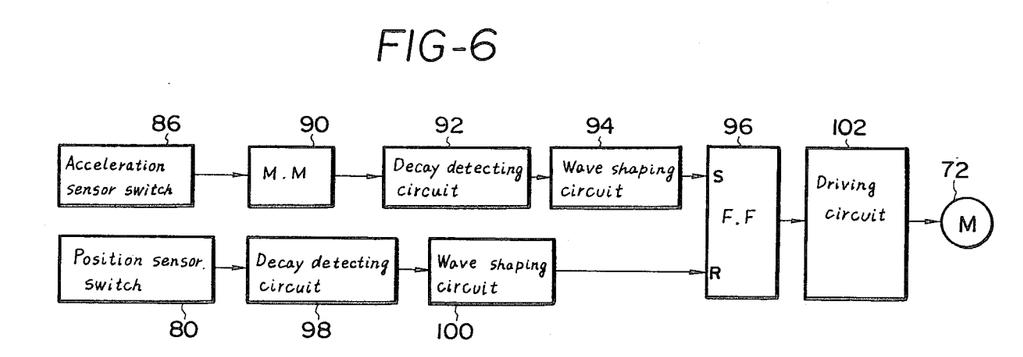
FIG. 6 is a block diagram showing a control circuit in accordance with a second embodiment of the present invention.
Figure 7:
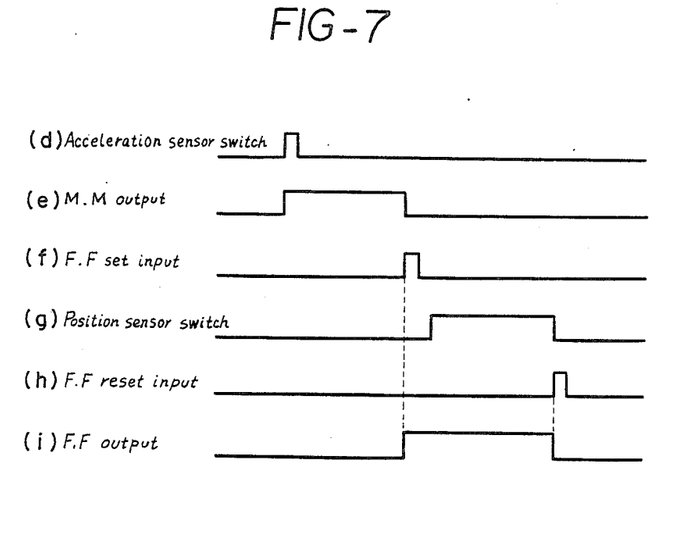
FIG. 7 is a waveform chart showing the operation of the second embodiment shown in FIG. 6.

In this embodiment, a monostable multivibrator 90 is activated in response to an ON signal (see FIG. 7(d)) from the acceleration sensor switch 86, and the decay of a pulse (see FIG. 7(e)) generated by the multivibrator 90 is detected by a decay detecting circuit 92. Then, the output of this circuit 92 is shaped by a wave shaping circuit 94, and a set pulse (see FIG. 7(f)) is output to the set terminal of a flip-flop 96. In response to this set pulse, the flip-flop 96 outputs a driving signal to a driving circuit 102. With this driving signal, the driving circuit 102 starts the motor 72 to rotate. Slightly after the motor 72 has been started, the position sensor switch 80 turns ON (see FIG. 7(g)). The decay of a signal from the switch 80 is detected by a decay detecting circuit 98. The output of the circuit 98 is shaped by a wave shaping circuit 100, and a reset pulse (see FIG. 7(h)) is then input to the reset terminal of the flip-flop 96. In consequence, the output signal from the flip-flop 96 is reset (see FIG. 7(i)), and the rotation of the motor 72 is also stopped.

It is to be noted that the circuit for automatically effecting disengagement in a normal state of the vehicle of this embodiment is similar to that of the first embodiment and therefore not shown in FIG. 6.

Accordingly, the second embodiment has the advantage that it is not necessary to set the time $T_2$ shown in FIG. 5 as in the first embodiment.

Figure 8:
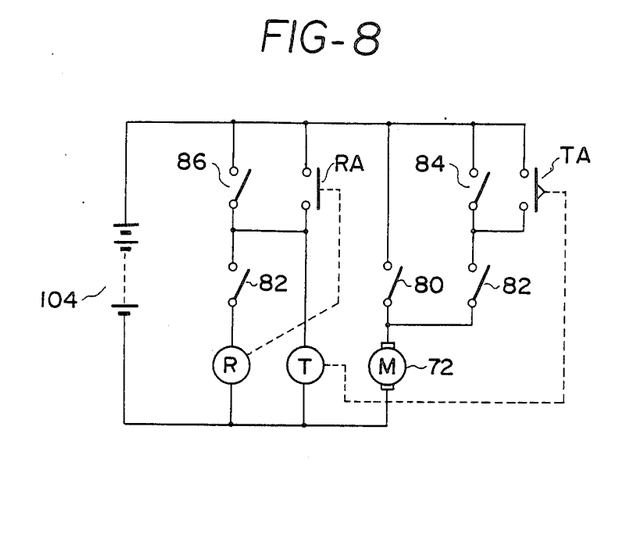
FIG. 8 is a diagram showing a control circuit in accordance with a third embodiment of the present invention.

The following is a description of a third embodiment of the present invention with reference to FIG. 8

In this embodiment, the control circuit is constituted by a relay, and the voltage applied to the motor 72 in a normal state of the vehicle and that in an emergency situation are set such as to be equal to each other.

A relay coil R which constitutes a relay is connected to a battery 104 through the acceleration sensor switch 86 and the engagement sensor switch 82. Accordingly, when an emergency situation of the vehicle occurs in a state wherein the occupant has the webbing fastened, the acceleration sensor switch 86 turns ON, and the engagement sensor switch 82 also turns ON, so that the relay coil R is excited. The connection point RA of the relay is connected in parallel to the acceleration sensor switch 86, and the relay is therefore kept in a self-holding state. Further, a delay timer T is connected in series to the a connection point RA such that when the a connection point RA is closed, the delay timer T is turned ON. The circuit for automatically effecting disengagement in a normal state of the vehicle of this embodiment is similar to that of the first embodiment. The a connection point TA of the delay timer T is connected in parallel to the door switch 84. The reference numeral 80 denotes a position sensor switch, while the numeral 82 denotes an engagement sensor switch.

Accordingly, when an emergency situation of the vehicle occurs, the a connection point TA is closed after a predetermined period of time has elapsed so as to effect an operation similar to that which is performed when the door is opened. In an emergency situation, therefore, the motor 72 is started to rotate even if the door is not opened, and the tongue plate 30 is thereby automatically disengaged from the buckle device.

What is claimed is:

1. A controller for automatically effecting disengagement of a buckle device in a vehicle, comprising:
   moving means for moving a lock plate which is engaged with a tongue plate;
   emergency sensor means for detecting an emergency situation of the vehicle;
   door sensor means for detecting whether a door of the vehicle is opened or closed;
   normal disengagement control means for activating said moving means when said door sensor means detects that the door is opened to move said lock plate in a direction in which said lock plate and said tongue plate are disengaged from each other; and
   emergency disengagement control means for activating said moving means when a predetermined period of time has elapsed after an emergency situation of the vehicle has been detected by said emergency sensor means to move said lock plate in a direction in which said lock plate and said tongue plate are disengaged from each other by a driving force larger than a driving force produced by said moving means in response to said normal disengagement control means.

2. A controller according to claim 1, wherein said emergency sensor means is an acceleration sensor means which is activated when the acceleration acting on the vehicle exceeds a predetermined value.

3. A controller according to claim 2, wherein said moving means includes a motor connected to a voltage source for moving said lock plate in a direction in which said lock plate is disengaged from said tongue plate, and said normal disengagement control means includes a resistor connected between said motor and said voltage source, for dropping the voltage of said voltage source imparted to said motor.

4. A controller according to claim 3, wherein said door sensor means includes a door switch, connected between said voltage source and said resistor, which turns ON when the door is opened, and an engagement sensor switch which turns ON when the tongue plate is engaged with the lock plate, said engagement sensor switch being connected with said door switch in series.

5. A controller according to claim 4, wherein said emergency disengagement control means includes a transistor connected between said voltage source and said motor in parallel with said resistor.

6. A controller for automatically effecting disengagement of a buckle device in a vehicle, comprising:
   a lock plate having an engagement pawl engageable with a tongue plate, said lock plate being constantly biased so as to be located at a reference position at which said engagement pawl is engageable with said tongue plate;
   moving means for moving said lock plate in a direction in which said engagement pawl is disengaged from said tongue plate against a biasing force;

acceleration sensor means activated when acceleration acting on the vehicle exceeds a predetermined value;

door sensor means activated when a door on the vehicle is opened;

engagement sensor means activated when said tongue plate and the engagement pawl of said lock plate are engaged with each other;

position sensor means activated when said lock plate moved by said moving means returns to said reference position;

emergency disengagement control means for activating said moving means when a predetermined period of time has elapsed after said acceleration sensor means has been activated, the operation of said moving means being stopped when said position sensor means is activated; and normal disengagement control means for activating said moving means when said engagement sensor means is in an operative state and said door sensor means is activated, the operation of said moving means being stopped when said position sensor means is activated;

said emergency disengagement control means activating said moving means to produce a driving force larger than a driving force produced through said moving means in response to said normal disengagement control means.

7. A controller according to claim 6, wherein said emergency disengagement control means activates said moving means when said engagement sensor means is in an operative state and a predetermined period of time has elapsed after said acceleration sensor means has been activated, and said emergency disengagement control means stops the operation of said moving means when said position sensor means is activated.

8. A controller according to claim 7, wherein said moving means includes a motor connected to a voltage source for moving said lock plate in a direction in which said lock plate is disengaged from said tongue plate, and said normal disengagement control means includes a resistor connected between said motor and said voltage source, for dropping said voltage imparted to said motor.

9. A controller according to claim 8, wherein said emergency disengagement control means includes a transistor connected between said motor and said voltage source in parallel with said resistor, and a voltage of said voltage source is imparted to said motor through said transistor in the emergency situation of the vehicle.

10. A controller according to claim 8, wherein said door sensor means includes a door switch, connected between said voltage source and said motor, which turns ON when the door is opened, and said engagement sensor means includes an engagement sensor switch which turns ON when the tongue plate is engaged with the lock plate, said engagement switch being connected with said door switch in series.

11. A controller according to claim 6, wherein said emergency disengagement control means comprises:

a differentiating circuit connected to said acceleration sensor means; and an integrated circuit which generates a pulse signal with a predetermined width when a signal is output from said differentiating circuit and which outputs an actuating signal to said moving means for a predetermined period of time from the time when said pulse signal decays or falls.

12. A controller according to claim 6, wherein said emergency disengagement control means comprises:

a monostable multivibrator which outputs a pulse signal with a predetermined width when said acceleration sensor means is activated;

a decay detector for detecting a decay of a signal output from said monostable multivibrator;

an operation detecting circuit which outputs a pulse signal when said position sensor means is activated; and a flip-flop having its set terminal connected with said decay detector and its reset terminal connected with said operation detecting circuit.

13. A controller for automatically effecting disengagement of a buckle device in a vehicle, comprising:

a lock plate having an engagement pawl engageable with a tongue plate, said lock plate being constantly biased so as to be located at a reference position at which said engagement pawl is engageable with said tongue plate;

moving means including a motor for moving said lock plate in a direction in which said engagement pawl is disengaged from said tongue plate by means of the turning force of said motor against biasing force;

an acceleration switch which turns on when acceleration acting on the vehicle exceeds a predetermined value and turns OFF when said acceleration is not greater than said predetermined value, said acceleration switch having one end thereof connected to a battery;

a position sensor switch which turns OFF when said lock plate is located at said reference position and turns ON when said lock plate is located at any position other than said reference position, said position sensor switch having one end thereof connected to the battery and the other end thereof connected to said motor;

a series circuit composed of a door switch and an engagement sensor switch, said door switch turning ON when a door of the vehicle is opened and turning OFF when the door is closed, and said engagement sensor switch turning ON when said tongue plate is engaged with said engagement pawl and turning OFF when said tongue plate is disengaged from said engagement pawl, said series circuit being connected in parallel to said position sensor switch; and an electric circuit, connected to the other end of said acceleration switch, which applies the battery voltage to said motor when a predetermined period of time has elapsed after said acceleration switch has turned ON.

14. A controller according to claim 13, wherein said electric circuit comprises:

a differentiating circuit connected to said other end of said acceleration switch;

an integrated circuit which generates a pulse signal with a predetermined width when a signal is output from said differentiating circuit and which outputs an actuating signal for a predetermined period of time from the time when said pulse signal decays or falls; and a transistor disposed so as to connect together said battery and said motor and turned ON by said actuating signal.

15. A controller according to claim 13, wherein said electric circuit comprises:

a monostable multivibrator connected to said other end of said acceleration switch;

a first decay detector connected to the output end of said monostable multivibrator;

a first wave shaping circuit connected to the output end of said first decay detector;

a second decay detector connected to the output end of said position sensor switch;

a second wave shaping circuit connected to the output end of said second decay detector;

a flip-flop having its set terminal connected with the output end of said first wave shaping circuit and its reset terminal connected with the output end of said second wave shaping circuit; and a driving circuit having its input end connected to the output end of said flip-flop and its output end connected to said motor.

16. A controller according to claim 13, wherein said electric circuit comprises:

a second series circuit composed of a switch and a relay coil constituting a relay which are interlocked with said engagement sensor switch, said second series circuit having one end thereof connected to said other end of said acceleration switch so as to be connected to one pole of said battery via said acceleration switch, and said second series circuit having the other end thereof connected to the other pole of said battery;

a first make contact connected in parallel to said acceleration switch and turned ON when said relay coil is excited;

a delay timer connected in parallel to said second series circuit; and a second make contact connected in parallel to said door switch and turned ON by said delay timer.

* * * * *